Sept. 27, 1960 H. J. SANDS ET AL 2,953,832
WIRE TYPE ANGLE CLAMP
Filed July 25, 1958
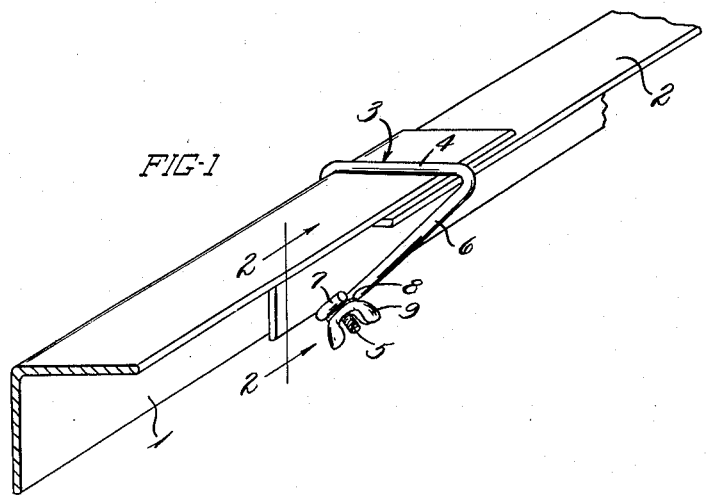
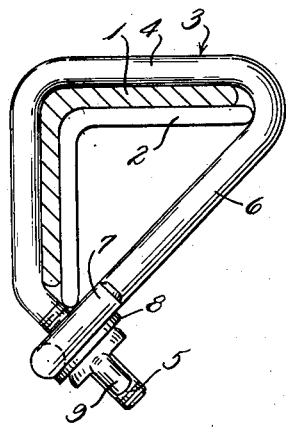
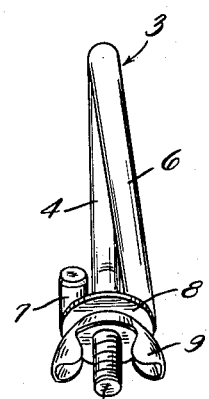
FIG-2　　　FIG-3
INVENTORS
HILLARD JAY SANDS
MELVIN E. ROCHE
BY
Oldham & Oldham
ATTYS- United States Patent Office 2,953,832
Patented Sept. 27, 1960

2,953,832

WIRE TYPE ANGLE CLAMP

Hillard Jay Sands, Cleveland, and Melvin E. Roche, Berea, Ohio, assignors to Harvard Manufacturing Company, Cleveland, Ohio Filed July 25, 1958, Ser. No. 751,025

4 Claims. (Cl. 24—243)

The present invention relates to clamp members, and especially to a novel and improved type of a wire or rod type of a clamp especially adapted for securing together a pair of telescoped metal angles, such as used in bedframes, or other similar members such as superimposed channel members.

Heretofore there has been an appreciable amount of work done in the design of various types of clamps for securing hoses to connecting tubular members, for securing metal angles together, or for other purposes. Many of such types of clamps provided heretofore have used strap means therein for encircling the members to be secured together and have had some type of an adjustable clamp member drawing end portions of the strap into tight binding engagement with the encircled articles. Or the loop may have end sections thereon with screw means engaging the end sections to draw such end sections together and draw the clamp strap or loop tightly into engagement with the members received within the loop. Obviously many of such clamps have had appreciable loads applied to them in use. It has been found that clamp straps, for example, when securing a pair of heavily loaded telescoped metal angles together, have bent, stretched or been otherwise deformed at the lateral margins of the strap where the major stresses are applied thereto. Obviously the bending or stretching of the clamp strap undesirably loosens the engagement of the clamp with the clamped articles and permits unwanted movement thereof.

Also, previous types of clamp strap means provided have been relatively expensive in that special end members normally are secured thereto, or are formed from or with the original clamp strap, as desired.

The general object of the present invention is to avoid and overcome the foregoing and other disadvantages present in prior types of clamp structures of the type defined and to provide a clamp characterized by the minimum number of parts therein and by the formation of a clamp from wire or rod.

Another object of the invention is to form a clamp structure that provides very effective three point contact with a pair of telescoped angles or other members received therein and wherein the clamping or tightening stresses exerted on the clamp member are applied normally to the longitudinal axes of the telescopically engaged clamped members.

A further object of the invention is to provide a clamp including a wire or rod loop therein wherein the forces applied to the clamp loop to stretch it coincide with the clamping axis and are not at right angles thereto as in many prior types of clamp structures.

Further objects of the invention are to provide a clamp which is relatively inexpensive to produce and is easy to slide on and off a pair of engaged or superimposed angles, or other members by spring action in a wire forming a clamp loop; to provide an improved holding action clamp unit adapted to carry relatively large loads on the members clamped together thereby without any deformation, bending or loosening of the clamp means; to provide a clamp having a wire loop therein providing ready clearance or adjustment therein for variation in size of the angle members clamped together thereby; and to provide a clamp member effective for securing any type of superimposed, or telescopically engaged members, such as angles, channels, or the like, together.

The foregoing and other objects and advantages of the invention will be made more apparent as the specification proceeds.

Reference now should be had to the accompanying drawings, wherein:

Fig. 1 is a perspective view of a novel clamp unit embodying the principles of the invention and showing it operatively engaged with a pair of superimposed angles;

Fig. 2 is a vertical section taken on line 2—2 of Fig. 1; and

Fig. 3 is an elevation of the clamp strap of Fig. 2 when removed from engagement with the angles shown.

When referring to corresponding members shown in the accompanying drawings and referred to in the specification, corresponding numerals are used to facilitate comparison therebetween.

When referring to top and bottom, or base surfaces, or the like in the accompanying specification and claims, these terms are used for reference purposes only and obviously the clamp of the invention can be used in any operative position.

This novel and improved clamp of the invention is useful for securing a pair of superimposed, or telescopically engaged members in fixed relationship with each other and wherein the clamp comprises a wire forming a closed loop with overlapped end portions in the wire and having one section of the wire contoured to engage one side of the superimposed members and with a threaded end portion of the wire extending parallel to the height axis of the clamp extending from such contoured wire section; the loop also having a base section contoured to extend across a base portion of the superimposed members and having an end portion connecting thereto that is doubled back on but spaced from the base section to form at least a partial loop through which the threaded end portion of the wire extends, and suitable nut and/or washer means engage the threaded end portion of the wire and operatively bear on the doubled back end portion thereof to draw against the top side of one of the members and pull it down against the other member and to exert forces on the base section of the other of the superimposed members so that the members are forced together by compressive forces exerted thereon by the contoured portion and base section of the wire loop.

Particular attention now is directed to the details of the structure shown in the drawings, and a pair of superimposed or telescopically engaged right angle in section metal angles 1 and 2 are shown. As previously indicated, the clamp means of the invention are adapted to be used with pairs of telescopically or superimposed members such as angles, channels, or equivalent members that are positioned in superimposed or nested relationship with each other.

The novel clamp of the invention is indicated as a whole by the numeral 3 and it is an important feature of the present invention that such clamp 3 is made from a wire or rod preferably of circular shape in section. The wire is shaped or bent to form a closed loop with overlapped end portions therein. One section 4 of the clamp is of generally inverted V-shape and is contoured to engage the outer surfaces, which may be considered to be one side of the upper, or outer one of the telescopically engaged metal angles 1. This section 4 has a threaded end portion 5 formed integrally therewith, and preferably extends parallel to the height axis of the clamp 3 and lies immediately adjacent one lateral margin of the metal angle 1.

The clamp or clamp loop 3 has a second section, or a base section 6 provided therein contoured to engage with the opposite side, surfaces, or base portion of the second or other of the telescopically engaged metal angles 2. In this specific embodiment of the invention, such surface or base portion of the angle 2 comprises the outer ends of the legs or flanges of the inner angle 2. This base section 6 of the clamp 3 has an end portion 7 integrally connected thereto and made from the remaining end of the wire or rod from which the clamp 3 is made. The end portion is doubled back on, but spaced from the base section 6 to form at least a partial loop, as best shown in Fig. 3, through which the threaded end portion 5 of the wire making the clamp 3 extends. The sections 4 and 6 can be considered to lie in and define a plane and it should be noted that the base section 6 and end portion 7 definitely do lie in and define a plane normal to the plane of sections 4 and 6.

The drawings also clearly show that a washer 8 preferably engages the threaded end portion 5 and bears on the end portion 7 of the clamp 3 while also bearing on a part of the base section 6 where the end portion 7 connects thereto. Thus the washer 8 bridges over the space between the end portion 7 and the base section 6 and forms a load transfer member so that a nut 9 of any conventional construction can be secured to the threaded end portion 5 and exert stress on the base section 6 and end portion 7 of the clamp 3 for tightening action. While a washer 8 is shown in conjunction with the nut 9, the basic requirement is that contact between the tightening means and the end portion 7 should be such that the tightening pressure bears on the circumferential axis of the loop to prevent spreading thereof. A large nut would accomplish this end but a washer, as shown, is the preferred construction.

By the particular loop construction shown for the clamp 3, a structure is made wherein the stresses set up in the clamp 3 by tightening the nut 9 on the end portion 5 are exerted parallel to the forces tending to stretch the wire forming the clamp 3. Such condition remains in force even when the angles 1 and 2 are operatively positioned with the clamp engaged therewith so that all forces exerted on the wire or rod forming the clamp 3 tend to stretch it in the same direction as the clamp can be tightened by applying tightening forces to the nut 9. Hence, no objectionable, or non-correctable loosening of the clamp 3 occurs in use.

It will be noted that the end portion or section 5 of the clamp 3 extends parallel to the height of the axis of of the generally triangularly shaped loop in the clamp 3. Effective clamping stresses are provided by the section 4 of the clamp engaging the outer metal angle 1 whereas the base section 6 of the clamp effectively engages widely spaced portions on the inner metal angle 2 to force these two metal angles into tight frictional and clamped engagement with each other.

It will be seen that the clamp of the invention is made from a minimum number of parts and that the loop formed in the clamp 3 can readily adjust itself in size so as to facilitate sliding the loop freely onto and off of the metal angles 1 and 2 when the nut 9 is loosened. Furthermore, a minimum length of metal wire or rod is used in forming the clamp 3 and the shaping of the wire used in the clamp 3 is readily effected.

The clamp 3 has inherent resiliency provided therein to facilitate the automatic loosening action desired and this greatly facilitates slipping the clamp to and from operative engagement with a given pair of members. The wire forming the clamp 3 will not be distorted or stretched in any manner in service except in a direction in which the clamp can be readily tightened up by the nut means provided. Hence, it is believed that the objects of the invention have been achieved.

While one complete embodiment of the invention has been disclosed herein, it will be appreciated that modification of this particular embodiment of the invention may be resorted to without departing from the scope of the invention as defined in the appended claims.

What is claimed is:

1. A clamp for a pair of superimposed angles, channels or similar members, which clamp comprises a wire forming a closed, generally triangular shaped loop with overlapped end portions and having one section contoured to engage adjacent outer sides of one of the superimposed members and having a threaded end portion extending parallel to the height axis of the clamp extending therefrom; said loop also having a base section contoured to extend across the base of said members and engage the other of said members, and having an end portion connecting thereto that is doubled back on but spaced from said base section to form a partial loop through which said threaded end portion extends; a washer on said threaded end portion and bearing on said doubled back end portion and said base section, and nut means engaging said threaded end portion and bearing on said washer to draw said contoured wire section against the outer sides of one of said members and to draw said base section against the base side of the other of said members to force said members together by forces applied parallel to the height axis of the clamp.

2. A clamp for a pair of superimposed angles, said clamp comprising a continuous triangulate wire form having two legs bent at substantially ninety degrees to each other with each of said legs adapted to provide contact with the leg surfaces of the outer angle of the superimposed angles and the hypotenuse leg of the said wire form adapted to provide contact with the leg extremities of the inner angle of the superimposed angles, one of said legs adjacent the ninety degree angle having a bent portion formed perpendicular to the hypotenuse leg with said bent portion adapted to extend beyond the hypotenue leg and having a threaded end thereon with the other end of the wire form being contained at the end of the hypotenuse leg and formed around the threaded end to provide an abutting surface normal to the axis of the threaded end for contact with a nut in engagement with said threaded end.

3. A clamp for a pair of superimposed angles, said clamp comprising a continuous triangulate wire form having two legs bent at substantially ninety degrees to each other with each of said legs adapted to provide contact with the leg surfaces of the outer angle of the superimposed angles and the hypotenuse leg of the said wire form adapted to provide contact with the leg extremities of the inner angle of the superimposed angles, one of said legs adjacent the ninety degree angle having a linear bent end portion formed perpendicular to the hypotenuse leg with said bent portion adapted to extend beyond the hypotenuse leg and having a threaded end thereon, the other end of the wire form having an open centered loop provided therein defining a plane perpendicular to said linear bent portion which extends through said open centered loop, and securing means engaging said threaded end and operatively bearing on said loop to draw against said bent portion and bring said wire form into pressure engagement with both angles received therein.

4. In combination, a clamp for a pair of superimposed angles, a pair of superimposed angles received within said clamp, said clamp comprising a continuous triangulate wire form having two legs bent at substantially ninety degrees to each other with each of said legs being in contact with the leg surfaces of the outer angle of the superimposed angles and the hypotenuse leg of the said wire form contacting the leg extremities of the inner angle of the superimposed angles, one of said legs adjacent the ninety degree angle having a bent portion formed perpendicular to the hypotenuse leg and extending beyond the hypotenuse leg and having a threaded end thereon, the other end of the wire form extending around the threaded end to provide an abutting surface normal to the axis of the threaded end for contact with securing means in engagement with said threaded end, and securing means engaging said threaded end and operatively bearing on said abutting surface to draw said wire form into effective engagement with both of the angles by force applied normal to the hypotenuse of the angles.

References Cited in the file of this patent

UNITED STATES PATENTS

| | | |
|---|---|---|
| 1,214,308 | Inglis et al. | Jan. 30, 1917 |
| 2,775,805 | Sands | Jan. 1, 1957 |